Patented Mar. 16, 1948

2,437,852

UNITED STATES PATENT OFFICE 2,437,852

PROCESS FOR SEPARATING DIACETONE AND MONOACETONE SORBOSE

William R. Graff, Plainfield, and William S. Harmon, Elizabeth, N. J., assignors to Merck & Co., Inc., Rahway, N. J., a corporation of New Jersey No Drawing. Application September 30, 1944, Serial No. 556,676

13 Claims. (Cl. 260—338)

This invention relates generally to improvements in a process for producing laevo-ascorbic acid (vitamin C) and particularly to a process for producing the intermediate diacetone sorbose in high yield in a form substantially free from impurities.

Laevoascorbic acid is obtained according to one process of manufacture by oxidation of diacetone laevo-sorbose followed by molecular rearrangement.

In the production of diacetone laevo-sorbose (hereinafter referred to as diacetone sorbose) according to one prior art process laevo-sorbose is acetonated in the presence of sulfuric acid and the reaction mixture is thereafter neutralized with an alkaline agent under essentially anhydrous conditions, the salt formed during neutralization being removed by filtration. Distillation of the filtrate is necessary to remove the greater part of the acetone, followed by fractional distillation under vacuum to separate the acetone, diacetone sorbose, and the higher boiling residue containing monoacetone sorbose. The mixture before distillation must be free of water or decomposition of both monoacetone sorbose and diacetone sorbose may occur with great violence. In order to dry the mixture thoroughly, long, cumbersome, and expensive processes have been necessary (for example, 10 hour stirring with potassium carbonate).

The high vacuum and high temperature distillation used for separating the acetonated sugars is difficult to carry out technically. The diacetone sorbose distillate may contain 10% to 20% impurities such as monoacetone sorbose. Even if the batch is completely dry the monoacetone sorbose residue, which is normally reacetonated to form additional diacetone sorbose, may be partially decomposed thus decreasing the overall yield of the desired product.

An object of this invention is to provide a novel process for preparing diacetone sorbose wherein a neutralized acetonation product comprising an acetone solution of diacetone sorbose, monoacetone sorbose, and traces of acetone polymers, and containing 10–15% of water, is continuously treated to obtain substantially pure diacetone sorbose. The acetone solution may be prepared by adding the proper amount of water to a neutralized acetonation product prepared according to the prior art process previously described; however, it is preferably prepared by neutralizing the acetonation product in aqueous solution and directly separating the acetone solution according to a novel process fully described in a companion application by J. F. Mahoney and H. H. Bassford, Jr. filed concurrently herewith Serial No. 556,674 filed September 30, 1944.

Another object of this invention is to provide a process for the continuous separate recovery of substantially pure acetone and monoacetone sorbose in a form and of a purity suitable for reacetonation, and for the elimination of acetone polymers comprising essentially mesityl oxide, the presence of which in the diacetone sorbose would seriously affect the yield in subsequent oxidation to diacetone keto gulonic acid.

Regarded in certain of its broader aspects, the novel process according to this invention comprises continuously distilling and rectifying an acetone solution of monoacetone sorbose, diacetone sorbose, acetone polymers, and 10–15% of water to remove volatile fractions consisting of acetone and acetone polymers and continuously removing an aqueous mixture containing monoacetone sorbose and diacetone sorbose substantially free of volatile components, and separating diacetone sorbose from said mixture.

To separate the diacetone sorbose from the monoacetone sorbose the fact that benzene will extract the diacetone compound from an aqueous solution of the mixture is utilized. If acetone or acetone polymers are present, however, they are also taken up by the benzene and tend to carry monoacetone sorbose with them resulting in a poor yield of diacetone sorbose and contamination of the diacetone sorbose which interferes seriously with subsequent oxidation of diacetone sorbose to diacetone-keto-gulonic acid.

By the improved process of this invention it has been found that the acetone solution may be continuously treated to quantitatively separate substantially pure acetone, acetone polymers, and a water solution of diacetone sorbose and monoacetone sorbose substantially free of impurities while at the same time removing ammonia from the system, and further to separate the monoacetone sorbose from the diacetone sorbose.

The acetone solution contains, in addition to the monoacetone sorbose, diacetone sorbose, acetone polymers and 10–15% of water, a small amount of inorganic salt and alkali introduced during neutralization. In the case of the preferred process of said companion application where ammonia is employed in neutralization the acetone solution contains a small amount of ammonia. The present process is hereinafter described as applied to an acetone solution which contains traces of ammonia, but it is to be understood that the reference to ammonia is by way of illustration and not of limitation.

The acetone solution is fed continuously to a distillation column having the proper number of theoretical plates to effect the desired separation. This column may be of any conventional type such for example as a bubble cap column or an open column packed with porcelain rings or other suitable inert material. Heat is applied to the column preferably through a calandria at the bottom of the column, and vapors from the top of the column comprising acetone and small amounts of ammonia are condensed, gaseous ammonia being liberated and the acetone being returned to the column as reflux. At a suitable plate below the top of the column a liquid draw-off of substantially pure acetone is taken, which constitutes a so-called pasteurized cut. The purpose of this procedure is to withdraw acetone at its boiling point, under which conditions gases such as ammonia are practically insoluble in acetone. The degree of purity of the acetone thus obtained depends upon the height of the column and the number of theoretical plates available for rectifying the acetone.

In the operation of the column, temperatures of 56° C. at the top and 104° C. at the bottom are maintained by proper control of heat at the calandria and the rates of feeding the acetone solution to the column and drawing the pasteurized cut.

A continuous vapor cut is also taken from the lower portion of the column which contains water vapor and acetone polymers, essentially mesityl oxide. The vapors are condensed and decanted, the water being returned to the column and acetone polymers being run to suitable storage.

The bottoms, a water solution of diacetone sorbose and monoacetone sorbose substantially free of acetone and acetone polymers is drawn continuously from the column through a suitable liquid level controller to an intermediate storage tank. Since the process is continuous, this storage tank, as well as other intermediate storage tanks hereinafter mentioned, is not necessary but it is desirable from a practical standpoint to absorb fluctuations in operation and to minimize the effect of localized mechanical failure and similar emergencies.

The bottoms drawn from the column as above mentioned is a dilute solution of mono- and diacetone sorbose whereas it is advantageous to have a concentrated solution, about 50–55% solids for subsequent separation of the mono- and diacetone sorbose. The dilute solution can be concentrated by passing it continuously to a long tube evaporator, the water vapor being preferably condensed and used in the neutralization step, thereby recovering traces of nono- and diacetone sorbose that may be carried over by the water vapor.

Instead of drawing as bottoms a dilute solution of mono- and diacetone sorbose the column can be provided with an additional continuous vapor draw-off at a point just above the liquid level in the column, thereby removing substantially pure water from the column and producing directly a concentrated solution of mono- and diacetone sorbose as bottoms.

Separation of diacetone sorbose from monoacetone sorbose is effected continuously by countercurrent extraction of the concentrate with benzene or other aromatic hydrocarbon solvents such as toluene, xylene, and the like or chlorinated hydrocarbons such as chloroform, ethylene dichloride, tetrachlorethane, and the like. The diacetone sorbose is extracted by the solvent; and the solvent is then continuously removed by open steam stripping and preferably simultaneously purified by taking a vapor draw-off in the stripping column to remove traces of acetone polymers that may be present. The rate of feed of benzene extract and steam to the stripping column are regulated to maintain temperatures of about 72–80° C. at the top of the column and 100° C. at the bottom and the bottoms, a water solution of diacetone sorbose, is withdrawn from the column and cooled as fast as it accumulates. The diacetone sorbose is therefore exposed to the relatively high temperature of the column for only a brief interval which results in the production of a light-colored and essentially pure product.

The cooled aqueous solution of diacetone sorbose is diluted with water to adjust the diacetone sorbose content to about 25%; and the dilute solution is filtered preferably through charcoal and diatomaceous silica, and passed to a final blend tank and accumulated for subsequent oxidation to diacetone keto gulonic acid. The purity of this diacetone sorbose makes possible yields of diacetone keto gulonic acid approaching 90% of theory when it is oxidized according to known methods.

By taking a vapor draw-off from the open steam stripping column the traces of acetone polymers are removed and contamination of the benzene is prevented. The benzene may therefore be recovered and recirculated indefinitely. The vapors thus drawn from the column are preferably condensed, and decanted, the water layer being returned to the system to save the traces of diacetone sorbose and the acetone polymers added to those previously recovered.

The raffinate obtained from the benzene extraction contains about 20% solids comprising essentially monoacetone sorbose and preferably less than 0.1% diacetone sorbose. The diacetone sorbose is kept below 0.1% by maintaining a sufficiently high ratio of solvent to concentrate feed in the extraction column. The 20% solution is concentrated to about 50% solids by evaporation and then further concentrated under vacuum to a temperature of about 65–70° C. until all the water has been removed. The anhydrous residue comprising substantially pure monoacetone sorbose is dissolved in enough acetone to make a solution of 70–75% solids suitable for reacetonation.

The monoacetone sorbose thus recovered is of a purity which enables conversion to diacetone sorbose according to the process of this invention, in a yield which is almost the theoretical amount possible on the basis of the amount of laevosorbose originally acetonated which was not originally recovered as diacetone sorbose. Since this process provides for substantially complete conversion of sorbose to diacetone sorbose, it affords a marked commercial advantage over previously known methods for producing diacetone sorbose; and the advantage is further enhanced by the efficient recovery of agents employed such as acetone and benzene, the ease of control of the apparatus required in the process, and the uniformity of operation and products that is made possible.

While the extraction of the aqueous mono- and diacetone sorbose solution with benzene is described, it is understood that other aromatic hydrocarbons and chlorinated hydrocarbons can be employed in like manner. It will further be understood that the several continuous steps of the continuous process can be operated separately if desired.

The process is described for purpose of illustration as applied to an acetone solution of mono- and diacetone sorbose containing 10–15% of water. It is understood, however, that actone solutions containing smaller and larger amounts of water can be processed in like manner. When acetone solutions containing smaller amounts of water are processed, the distillation column can be heated at least in part by open steam, and the condensed steam supplies water for dissolving the mono- and diacetone sorbose to be recovered.

Modifications may be made in carrying out the present invention without departing from the spirit and scope thereof, and the invention is to be limited only by the appended claims.

What is claimed is:

1. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components.

2. The process that comprises continuously distilling and rectifying a solution composed predominantly of acetone, monoacetone sorbose, diacetone sorbose and water and containing small amounts of acetone polymers and ammonia to remove volatile fractions composed of acetone polymers, ammonia, and substantially pure acetone, and at the same time continuously withdrawing as bottoms an aqueous mixture containing monoacetone sorbose and diacetone sorbose substantially free of volatile components.

3. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, and separating diacetone sorbose from said mixture by solvent extraction.

4. The process that comprises continuously distilling and rectifying a neutral to mildly alkaline solution composed predominantly of acetone, monoacetone sorbose, diacetone sorbose and water to remove volatile fractions composed of acetone polymers and substantially pure acetone, and at the same time continuously withdrawing as bottoms an aqueous mixture containing monoacetone sorbose and diacetone sorbose essentially free of volatile components, continuously extracting said aqueous mixture with a solvent selected from the class consisting of aromatic hydrocarbon liquids and chlorinated hydrocarbon liquids and recovering a solvent solution of diacetone sorbose substantially free of monoacetone sorbose and an aqueous solution of monoacetone sorbose substantially free of diacetone sorbose.

5. The process that comprises continuously distilling and rectifying a neutral to mildly alkaline solution composed predominantly of acetone, monoacetone sorbose, diacetone sorbose and water to remove volatile fractions composed of acetone polymers and substantially pure acetone, and at the same time continuously withdrawing as bottoms an aqueous mixture containing monoacetone sorbose and diacetone sorbose essentially free of volatile components, continuously extracting said aqueous mixture with benzene and recovering a benzene solution of diacetone sorbose substantially free of monoacetone sorbose and an aqueous solution of monoacetone sorbose substantially free of diacetone sorbose.

6. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, continuously extracting said aqueous mixture with a counterflow of a solvent selected from the class consisting of aromatic hydrocarbon liquids and chlorinated hydrocarbon liquids to form a solvent solution of diacetone sorbose and an aqueous solution of monoacetone sorbose, continuously steam stripping said solvent solution and recovering an aqueous solution of substantially pure diacetone sorbose.

7. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, continuously extracting said aqueous mixture with a counterflow of a solvent selected from the class consisting of aromatic hydrocarbon liquids and chlorinated hydrocarbon liquids to form a solvent solution of diacetone sorbose and an aqueous solution of monoacetone sorbose, continuously steam stripping said solvent solution while taking a continuous vapor draw to remove traces of acetone polymers present in said solution, and recovering substantially pure solvent and an aqueous solution of substantially pure diacetone sorbose.

8. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, continuously extracting said aqueous mixture with a counterflow of benzene to form a benzene solution of diacetone sorbose and an aqueous solution of monoacetone sorbose, continuously steam stripping said benzene solution, and recovering an aqueous solution of substantially pure diacetone sorbose.

9. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, continuously extracting said aqueous mixture with a counterflow of benzene to form a benzene solution of diacetone sorbose and an aqueous solution of monoacetone sorbose, continuously steam stripping said benzene solution while taking a continuous vapor draw to remove traces of acetone polymers present in said solution, and recovering substantially pure benzene and an aqueous solution of substantially pure diacetone sorbose.

10. The process that comprises continuously distilling a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, continuously extracting said aqueous mixture with a counterflow of a solvent selected from the class consisting of aromatic hydrocarbon liquids and chlorinated hydrocarbon liquids to form a solvent solution of diacetone sorbose and an aqueous solution of monoacetone sorbose, dehydrating said aqueous solution and recovering monoacetone sorbose substantially free of diacetone sorbose and of a quality suitable for reacetonation.

11. The process that comprises continuously distilling and rectifying a neutral to mildly alkaline solution composed predominantly of acetone, monoacetone sorbose, diacetone sorbose and water to remove volatile fractions composed of acetone and acetone polymers, and at the same time continuously withdrawing as bottoms an aqueous mixture containing monoacetone sorbose and diacetone sorbose essentially free of volatile components, continuously extracting said aqueous mixture with a counterflow of benzene to form a benzene solution of diacetone sorbose and an aqueous solution of monoacetone sorbose, dehydrating said aqueous solution and recovering monoacetone sorbose substantially free of diacetone sorbose and of a quality suitable for reacetonation.

12. The process that comprises continuously steam stripping in a column a substantially neutral solution composed predominantly of diacetone sorbose in a solvent selected from the class consisting of aromatic hydrocarbon liquids and chlorinated hydrocarbon liquids while continuously taking a vapor draw from the lower portion of the column to remove traces of acetone polymers present in said solution and recovering substantially pure solvent from the distillate and, as bottoms an aqueous solution of substantially pure diacetone sorbose.

13. The process that comprises continuously steam stripping in a column a substantially neutral solution composed predominantly of diacetone sorbose and benzene while continuously taking a vapor draw from the lower portion of the column to remove traces of acetone polymers present in said solution and recovering substantially pure benzene from the distillate and as bottoms an aqueous solution of substantially pure diacetone sorbose.

WILLIAM R. GRAFF.
WILLIAM S. HARMON.

REFERENCES CITED

The following references are of record in the file of this patent:

UNITED STATES PATENTS

| Number | Name | Date |
| --- | --- | --- |
| 2,301,811 | Reichstein | Nov. 10, 1942 |